(12) United States Patent
Ikeda et al.

(10) Patent No.: US 12,544,729 B2
(45) Date of Patent: Feb. 10, 2026

(54) REACTOR

(71) Applicant: Osaka Gas Co., Ltd., Osaka (JP)

(72) Inventors: Koichiro Ikeda, Osaka (JP); Sho Nakagami, Osaka (JP); Hinako Matsuo, Osaka (JP); Yukio Hiranaka, Osaka (JP); Satoshi Mori, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 719 days.

(21) Appl. No.: 17/914,561

(22) PCT Filed: Mar. 23, 2021

(86) PCT No.: PCT/JP2021/012050
§ 371 (c)(1),
(2) Date: Sep. 26, 2022

(87) PCT Pub. No.: WO2021/193657
PCT Pub. Date: Sep. 30, 2021

(65) Prior Publication Data
US 2023/0158463 A1    May 25, 2023

(30) Foreign Application Priority Data
Mar. 26, 2020   (JP) .................................. 2020-055400

(51) Int. Cl.
 *B01J 8/06*   (2006.01)
 *B01J 8/00*   (2006.01)
 *B01J 8/02*   (2006.01)

(52) U.S. Cl.
 CPC .............. *B01J 8/065* (2013.01); *B01J 8/008* (2013.01); *B01J 8/0214* (2013.01); *B01J 8/0292* (2013.01);
(Continued)

(58) Field of Classification Search
 CPC . B01J 8/065; B01J 8/008; B01J 8/0214; B01J 8/0292; B01J 8/067;
(Continued)

(56) References Cited

U.S. PATENT DOCUMENTS

2006/0185243 A1    8/2006 Kuwabara et al.

FOREIGN PATENT DOCUMENTS

| EP | 1602627 A1 | 7/2005 |
| JP | 6082431 A | 5/1985 |

(Continued)

OTHER PUBLICATIONS

Machine translation of JP-S6227489 A—year 2025.*

*Primary Examiner* — Huy Tram Nguyen
(74) *Attorney, Agent, or Firm* — The Webb Law Firm

(57) ABSTRACT

Provided is a reactor that is capable of suppressing deformation and damage of catalyst grains due to contraction of a reaction tube after thermal expansion thereof. A reactor includes: a reaction tube A aligned in an up-down direction and having, in a bottom section thereof, a catalyst supporter receiving packed catalyst grains and allowing a processed gas to flow therethrough; and a burning unit configured to heat an outer face of the reaction tube A. The reaction tube A has a cylindrical catalyst support face U that is in contact with the catalyst grains in the reaction tube A and that have, in the up-down direction, a plurality of engaging recesses each capable of receiving a portion of the catalyst grain in contact with the catalyst support face in such a manner that the portion of the catalyst grain is fitted into the engaging recess.

3 Claims, 4 Drawing Sheets

(52) U.S. Cl.
CPC ...... *B01J 8/067* (2013.01); *B01J 2208/00504* (2013.01); *B01J 2208/00884* (2013.01)

(58) Field of Classification Search
CPC .... B01J 2208/00504; B01J 2208/00884; B01J 8/025; B01J 8/062; B01J 8/0257; C01B 2203/0233; C01B 2203/043; C01B 2203/0816; C01B 3/384; C01B 3/48; C01B 3/38
USPC ........................................................ 422/162
See application file for complete search history.

(56) References Cited

FOREIGN PATENT DOCUMENTS

| | | | |
|---|---:|---|---|
| JP | 6082431 | U | 6/1985 |
| JP | 6089235 | A | 6/1985 |
| JP | 6227304 | A | 2/1987 |
| JP | 6227489 | A | 2/1987 |
| JP | S6227489 | A * | 2/1987 |
| JP | 3109933 | A | 5/1991 |
| JP | 4119902 | A | 4/1992 |
| JP | 669882 | B2 | 9/1994 |
| JP | 200324765 | A | 1/2003 |
| JP | 2004292269 | A | 10/2004 |
| JP | 2007186351 | A | 7/2007 |

\* cited by examiner

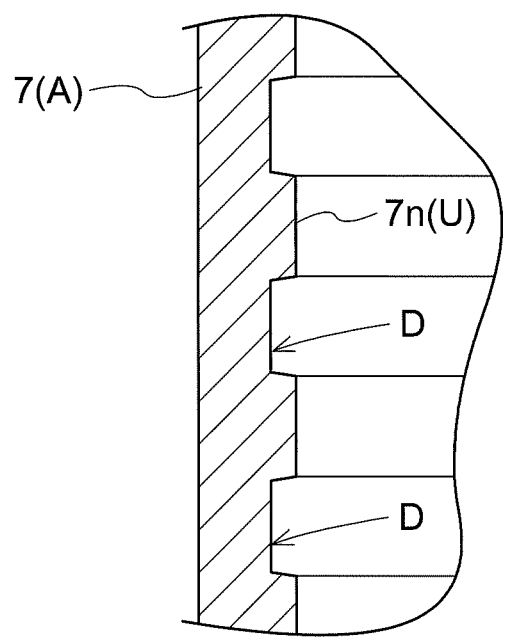

REACTOR

CROSS-REFERENCE TO RELATED APPLICATIONS

This application is the United States national phase of International Application No. PCT/JP2021/012050 filed Mar. 23, 2021, and claims priority to Japanese Patent Application No. 2020-055400 filed Mar. 26, 2020, the disclosures of which are hereby incorporated by reference in their entirety.

BACKGROUND OF THE INVENTION

Field of the Invention

The present invention relates to a reactor that includes: a reaction tube aligned in an up-down direction and having, in a bottom section thereof, a catalyst supporter receiving packed catalyst grains and allowing a processed gas to flow therethrough; and a burning unit configured to heat an outer face of the reaction tube.

Description of Related Art

This type of reactor is used to perform a reaction process on a feedstock gas, which is a hydrocarbon gas such as natural gas or naphtha, to reform the feedstock gas into a reformed gas with a high hydrogen content through a steam reforming process by feeding the feedstock gas mixed with steam between an outer tube and an inner tube of the reaction tube.

Conventional examples of this type of reactor include a reactor that includes: a reaction tube including an outer tube having a closed bottom section and a supported upper end section, and an inner tube having an upper end section supported inside the outer tube and an open bottom section, with catalyst grains packed between the outer tube and the inner tube; and a partition plate serving as a catalyst supporter, having a large number of pores, located in the bottom section of the inner tube, and receiving and supporting the catalyst grains packed between the outer tube and the inner tube (e.g., see Patent Document 1).

PATENT DOCUMENTS

Patent Document 1: JP H6-69882B

SUMMARY OF THE INVENTION

If a reactor is switched from a heating stop state, in which heating by the burning unit is stopped, to a heating operation state, in which the burning unit heats the reaction tube, the distance between catalyst support faces of the reaction tube increases due to thermal expansion of the reaction tube caused by a temperature rise. If the reactor is thereafter switched from the heating operation state, in which the burning unit heats the reaction tube, to the heating stop state, in which the heating by the burning unit is stopped, the distance between the catalyst support faces of the reaction tube decreases due to the contraction of the reaction tube caused by a temperature drop.

As a result, there is a concern that the catalyst grains packed in the reaction tube may be subjected to a large compressive force and be deformed and damaged, and there has been a desire for improvement on this point.

Taking the reactor described in Patent Document 1 as an example to add an explanation, the temperature of the outer tube, whose outer face is heated by the burning unit, becomes higher than the temperature of the inner tube located inside the outer tube in the heating operation state in which the burning unit heats the reaction tube. Therefore, switching the burning unit from the heating stop state to the heating operation state expands the outer tube in the radial direction more than the inner tube and increases the distance between the inner face of the outer tube and the outer face of the inner tube that serve as the catalyst support faces.

If the burning unit is thereafter switched from the heating operation state to the heating stop state, the outer tube contracts in the radial direction more than the inner tube, and the distance between the inner face of the outer tube and the outer face of the inner tube that serve as the catalyst support faces decreases.

As a result, after the burning unit is switched from the heating stop state to the heating operation state, the outer tube expands in the radial direction more than the inner tube, and the gap between the outer face of the inner tube and the inner face of the outer tube increases, thus moving the catalyst grains packed between the inner tube and the outer tube downward while spreading in the radial direction.

Then, after the burning unit is switched from the heating operation state to the heating stop state, the outer tube contracts in the radial direction more than the inner tube, and the gap between the outer face of the inner tube and the inner face of the outer tube decreases, thus pushing up the catalyst grains packed between the inner tube and the outer tube. At this time, there is a concern that the catalyst grains may be deformed and damaged due to, for example, the catalyst grains being deformed by a large compression effect.

Some reaction tubes are constituted by a single cylindrical tubular body. In the case of these reaction tubes as well, after the burning unit is switched from the heating stop state to the heating operation state, the inner face of the tubular body that serve as a catalyst support face expands in the radial direction as the tubular body expands in the radial direction, thus moving the catalyst grains packed in the tubular body downward while spreading in the radial direction. Then, after the burning unit is switched from the heating operation state to the heating stop state, the tubular body contracts in the radial direction, and the inner faces of the tubular body that serve as catalyst support faces contracts in the radial direction, thus pushing up the catalyst grains packed in the tubular body. At this time, there is a concern that the catalyst grains may be deformed and damaged due to, for example, the catalyst grains being deformed by the large compression effect.

The present invention has been made in view of the foregoing circumstances, and aims to provide a reactor capable of suppressing deformation and damage of the catalyst grains due to contraction of the reaction tube after its thermal expansion.

A reactor of the present invention includes: a reaction tube aligned in an up-down direction and having, in a bottom section thereof, a catalyst supporter receiving packed catalyst grains and allowing a processed gas to flow therethrough; and a burning unit configured to heat an outer face of the reaction tube. The characteristic configuration of this reactor lies in that the reaction tube has a cylindrical catalyst support face that is in contact with the catalyst grains in the reaction tube and that have, in the up-down direction, a plurality of engaging recesses each capable of receiving a portion of the catalyst grain in contact with the catalyst support face in such a manner that the portion of the catalyst grain is fitted into the engaging recess.

Note that the "catalyst grains" in the above description mean catalyst grains having any shape, such as a spherical shape or a pellet shape.

That is, the catalyst support face of the reaction tube that is in contact with the catalyst grains has, in the up-down direction, a plurality of engaging recesses each capable of receiving a portion of the catalyst grain in contact with the catalyst support face in such a manner that the portion of the catalyst grain is fitted into the engaging recess. Therefore, in the heating stop state in which heating by the burning unit is stopped, the catalyst grains are packed in the reaction tube while significantly receiving with the engaging recesses.

If, with the catalyst grains thus packed, the heating stop state in which heating by the burning unit is stopped is switched to the heating operation state in which the reaction tube is heated by the burning unit, the packed catalyst grains attempt to move downward while spreading in the radial direction since the reaction tube thermally expands due to a temperature rise and the distance between catalyst support faces of the reaction tube increases. However, some of the packed catalyst grains continue to receive with the engaging recesses. Therefore, even if the catalyst grains move downward, the amount of downward movement is kept small.

If the burning unit is thereafter switched from the heating operation state to the heating stop state, the distance between the catalyst support faces of the reaction tube is reduced by contraction of the reaction tube due to a temperature drop, thus pushing up the packed catalyst grains. However, the amount of downward movement of the catalyst grains in the heating operation state is kept small. Therefore, even if the catalyst grains are pushed up, the amount by which the catalyst grains are pushed up is small, and the catalyst grains can avoid being subjected to a large compression effect. As a result, deformation and damage of the catalyst grains can be suppressed.

In short, according to the characteristic configuration of the reactor of the present invention, deformation and damage of the catalyst due to contraction of the reaction tube after its thermal expansion can be suppressed.

An additional characteristic configuration of the reactor of the present invention lies in that each of the engaging recesses has an annular recessed groove shape.

That is, the engaging recesses can be easily formed since each of the engaging recesses has an annular recessed groove shape, which is advantageous in terms of implementation and production.

In other words, it is easy to form the engaging recesses having an annular recessed groove shape on a cylindrical catalyst support face by, for example, cutting the cylindrical catalyst support face while rotating the reaction tube.

In contrast, it is conceivable, for example, to form hole-shaped recessed portions as the engaging recesses in a staggered arrangement on the cylindrical catalyst support face. However, in this case, it is difficult to form a plurality of engaging recesses that are hole-shaped recessed portions by, for example, cutting the cylindrical catalyst support face, since this is more complicated work.

In short, according to the additional characteristic configuration of the reactor of the present invention, the engaging recesses can be easily formed, which is advantageous in terms of implementation and production.

An additional characteristic configuration of the reactor of the present invention lies in that each of the engaging recesses has an upper inclined face that is gradually inclined downward from an upper end of an entrance section toward a distal section in a depth direction, and a lower inclined face that is gradually inclined upward from a lower end of the entrance section toward the distal section.

That is, since each engaging recess has an upper inclined face that is gradually inclined downward from the upper end of the entrance section toward the distal section in the depth direction, and the lower inclined face that is gradually inclined upward from the lower end of the entrance section toward the distal section in the depth direction, the engaging recess can receive a portion of a catalyst grain that is to be fitted into the engaging recess with use of the upper and lower inclined faces. Therefore, damage of the surface part of the catalyst grain can be suppressed when the engaging recess engages with and supports the catalyst grain.

In other words, if an engaging recess has a constant width from the entrance section to the distal section in the depth direction, this engaging recess receives a portion of a catalyst grain that is to be fitted into the engaging recess with use of sharp corners of the entrance section. Then, there is a concern that the surface part of the catalyst grain is damaged when the engaging recess engages with and supports the catalyst grain.

In short, according to the additional characteristic configuration of the reactor of the present invention, damage of the surface part of the catalyst grain can be suppressed when each engaging recess engages with and supports the catalyst grain.

An additional characteristic configuration of the reactor of the present invention lies in that the reaction tube includes an outer tube having a closed bottom section and a supported upper end section, and an inner tube having an open bottom section and located inside the outer tube such that an upper end section of the inner tube is supported, the catalyst grains are packed between the outer tube and the inner tube, the catalyst supporter is located in a bottom section of the inner tube, the burning unit is configured to heat an outer face of the outer tube, the inner tube has an outer face serving as the catalyst support face and having the engaging recesses, and the outer tube has an inner face serving as the catalyst support face and having a flat shape.

That is, the reaction tube includes an outer tube having a closed bottom section and a supported upper end section, and an inner tube having an open bottom section and located inside the outer tube such that an upper end section of the inner tube is supported. The catalyst grains are packed between the outer tube and the inner tube. The catalyst supporter is located in a bottom section of the inner tube. The burning unit is configured to heat an outer face of the outer tube.

In this reactor, the temperature of the outer tube whose outer face is heated by the burning unit becomes higher than the temperature of the inner tube located inside the outer tube while the burning unit is in the heating operation state. Therefore, after the burning unit is switched from the heating stop state to the heating operation state, the outer tube tends to extends in the axial direction more than the inner tube; for example, the outer tube extends more than the inner tube in the case where the outer tube and the inner tube are made from the same material.

In view of this point, the catalyst support face (outer face) of the inner tube has the engaging recesses, and the catalyst support face (inner face) of the outer tube has a flat shape. Thus, damage of the catalyst grains can be avoided even if the outer tube extends in the axial direction more than the inner tube while the burning unit is in the heating operation state.

More specifically, after the burning unit is switched from the heating stop state to the heating operation state, the outer tube expands in the radial direction more than the inner tube, and the gap between the inner tube and the outer tube increases. This causes the catalyst grains packed between the inner tube and the outer tube to attempt to move downward while spreading in the radial direction. However, some of the packed catalyst grains continue to receive with the engaging recesses. Therefore, even if the catalyst grains move downward, the amount of downward movement is kept small.

Then, after the burning unit is switched from the heating operation state to the heating stop state, the outer tube contracts in the radial direction more than the inner tube, and the gap between the inner tube and the outer tube decreases, thus pushing up the catalyst grains packed between the inner tube and the outer tube. However, the amount of downward movement of the catalyst grains in the heating operation state is kept small. Therefore, even if the catalyst grains are pushed up, the amount by which the catalyst grains are pushed up is small, and the catalyst grains can avoid being subjected to a significant compression effect. As a result, deformation and damage of the catalyst grains can be suppressed.

Further, the outer tube extends in the axial direction more than the inner tube in response to switching the burning unit from the heating stop state to the heating operation state, and the catalyst support face (inner face) of the outer tube, which contracts in the axial direction more than the inner tube in response to switching the burning unit from the heating operation state to the heating stop state, has a flat shape. Therefore, this catalyst support face (inner face) of the outer tube can smoothly slide relative to the catalyst grains packed between the inner tube and the outer tube and received by the catalyst supporter located in the bottom section of the inner tube, thus suppressing damage of the catalyst grains.

In short, according to the additional characteristic configuration of the reactor of the present invention, damage of the catalyst grains can be avoided even if the outer tube extends more than the inner tube in the heating operation state in which the burning unit heats the outer tube.

An additional characteristic configuration of the reactor of the present invention lies in that the reaction tube is a single cylindrical tubular body packed with the catalyst grains, and the catalyst support face of the tubular body has the engaging recesses.

That is, the reaction tube is a single cylindrical tubular body packed with the catalyst grains, and the catalyst support face (inner face) of the tubular body has the engaging recesses, thereby suppressing damage of the packed catalyst grains.

That is, after the burning unit is switched from the heating stop state to the heating operation state, the catalyst grains packed in the tubular body move downward while spreading in the radial direction as the tubular body expands in the radial direction. However, some of the packed catalyst grains continue to receive with the engaging recesses. Therefore, even if the catalyst grains move downward, the amount of downward movement is kept small.

Then, after the burning unit is switched from the heating operation state to the heating stop state, the tubular body contracts in the radial direction, thus pushing up the catalyst grains packed in the tubular body. However, the amount of downward movement of the catalyst grains in the heating operation state is kept small. Therefore, even if the catalyst grains are pushed up, the amount by which the catalyst grains are pushed up is small, and the catalyst grains can avoid being subjected to a significant compression effect. As a result, deformation and damage of the catalyst grains can be suppressed.

In short, according to the additional characteristic configuration of the reactor of the present invention, deformation and damage of the catalyst grains can be suppressed in the case where reaction tube is a single cylindrical tubular body packed with catalyst grains.

BRIEF DESCRIPTION OF THE DRAWINGS

FIG. 6 is a cross-sectional view of engaging recesses of the reforming apparatus with the other configuration.

DESCRIPTION OF THE INVENTION

Embodiment

Hereinafter, an embodiment of the present invention will be described with reference to the drawings.

Overall Configuration of Reforming Apparatus

Figure 1:
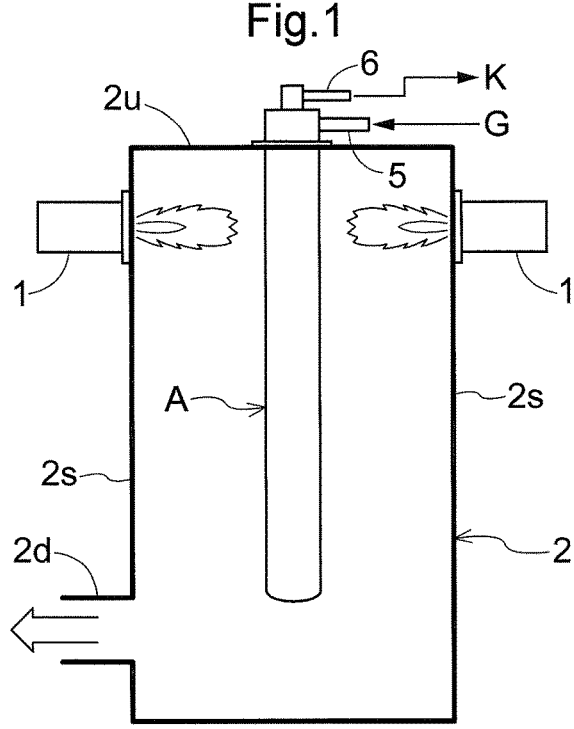
FIG. 1 is a schematic vertical cross-sectional view of a reforming apparatus as viewed from the front.

A reforming apparatus, which is an example of a reactor, has a reforming furnace 2 that includes a reaction tube A for reforming reaction to reform a feedstock gas G, which is hydrocarbon gas such as natural gas or naphtha, to a reformed gas K with high hydrogen content through a steam reforming process, and burners 1, each of which serves as a burning unit configured to heat the reaction tube A to a reforming reaction temperature, as shown in FIG. 1.

The reforming apparatus shown as an example has the reaction tube A that is supported by an upper wall $2u$ of the reforming furnace 2 while penetrating this upper wall $2u$, and two burners 1 located on left and right side walls $2s$ of the reforming furnace 2.

A burning gas of the burners 1 heats the reaction tube A and is thereafter discharged from an exhaust gas outlet $2d$ of the reforming furnace 2.

Figure 2:
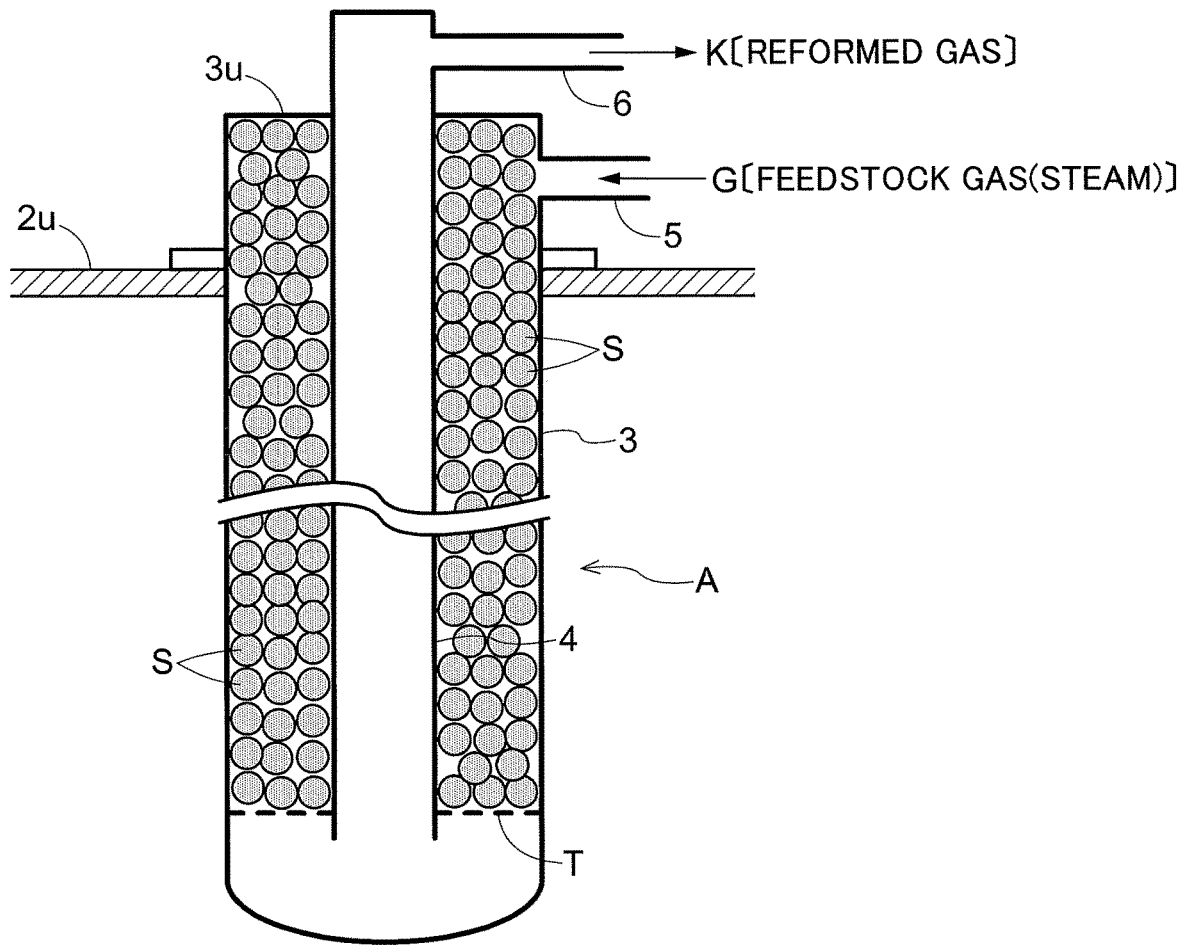
FIG. 2 is a schematic vertical cross-sectional view of a reaction tube, a part of which is omitted, as viewed from the front.

The reaction tube A includes, as shown in FIG. 2, an outer tube 3 having a closed bottom section, and an inner tube 4 that is located inside the outer tube 3 and has an open bottom section. Catalyst grains S are packed between the outer tube 3 and the inner tube 4 to form a packed section.

An upper end section of the outer tube 3 is supported by the upper wall $2u$ of the reforming furnace 2 while penetrating the upper wall $2u$. An upper end section of the inner tube 4 is supported by a tube upper wall $3u$ of the outer tube 3 while penetrating the tube upper wall $3u$.

A porous body T (an example of a catalyst supporter) that receives the catalyst grains S and allows the reformed gas K (an example of a processed gas) to pass therethrough is located between the outer tube 3 and the inner tube 4 and is supported by a bottom section of the inner tube 4.

A feedstock gas tube 5 for introducing a feedstock gas G, in which steam is mixed, is connected to a portion of the outer tube 3 that protrudes from the upper wall 2u of the reforming furnace 2. A reformed gas guide tube 6 for guiding the reformed gas K is connected to a portion of the inner tube 4 that protrudes from the tube upper wall 3u of the outer tube 3.

The outer tube 3 of the reaction tube A is heated to a high temperature (e.g., the average temperature is about 800° C.) by being heated to a target temperature for the reforming reaction by the burners 1, and the catalyst grains S and the inner tube 4 are heated to a temperature lower than the outer tube 3 (e.g., the average temperature is about 650° C.), with the temperature rise of the outer tube 3.

The feedstock gas G introduced from the feedstock gas tube 5 flows downward through the section packed with the catalyst grains S between the outer tube 3 and the inner tube 4, thereby being reformed to a reformed gas K with high hydrogen content through a steam reforming process. The reformed gas K flows upward through the inside of the inner tube 4 and is then discharged through the reformed gas guide tube 6.

Note that, although a detailed description is omitted, the reformed gas K discharged through the reformed gas guide tube 6 is conveyed to a CO transformer and subjected to a transforming process to transform carbon monoxide contained in the reformed gas K into carbon dioxide with use of the CO transformer. Thereafter, the reformed gas K is fed to a pressure swing absorber (PSA) to produce a product gas with high hydrogen content, for example.

Details of Reaction Tube

Figure 3:
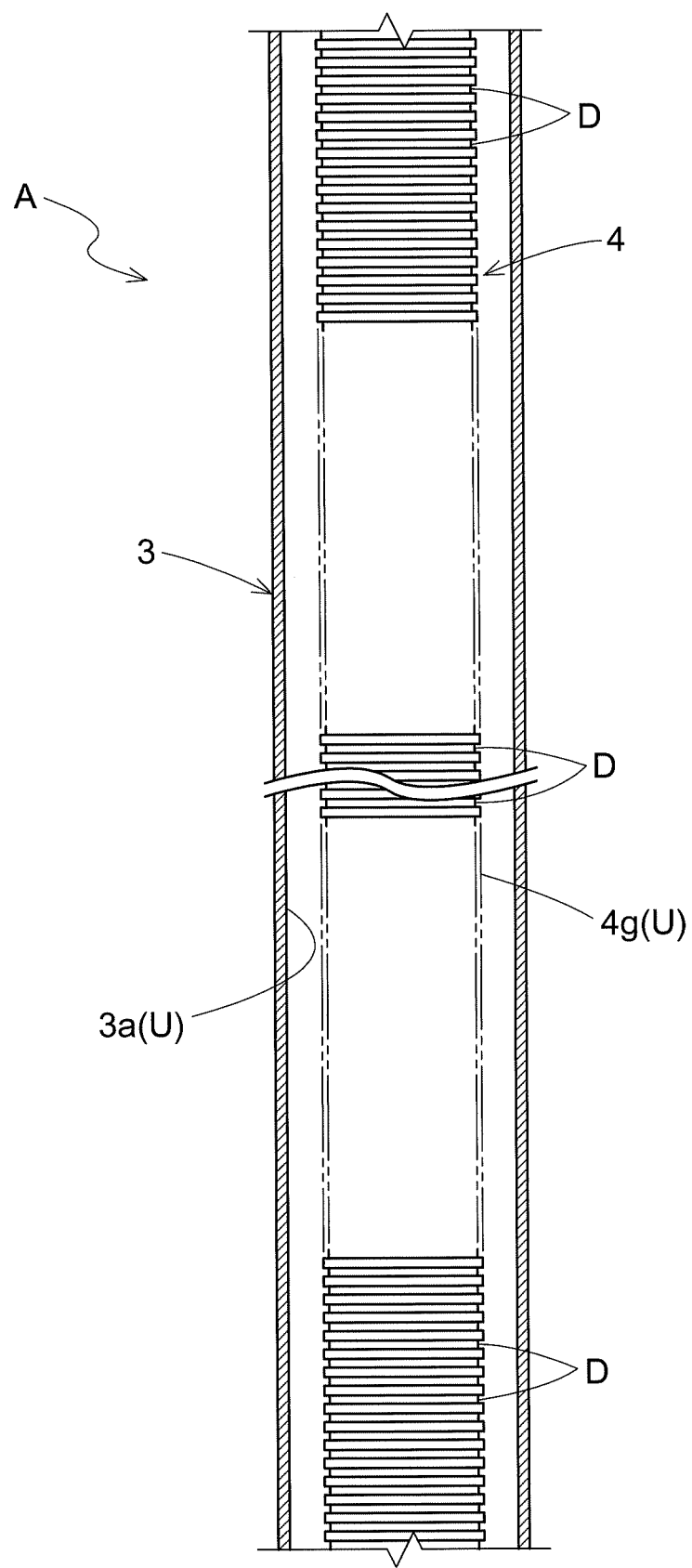
FIG. 3 is a partially omitted cross-sectional view of a main part of the reaction tube.
Figure 4:
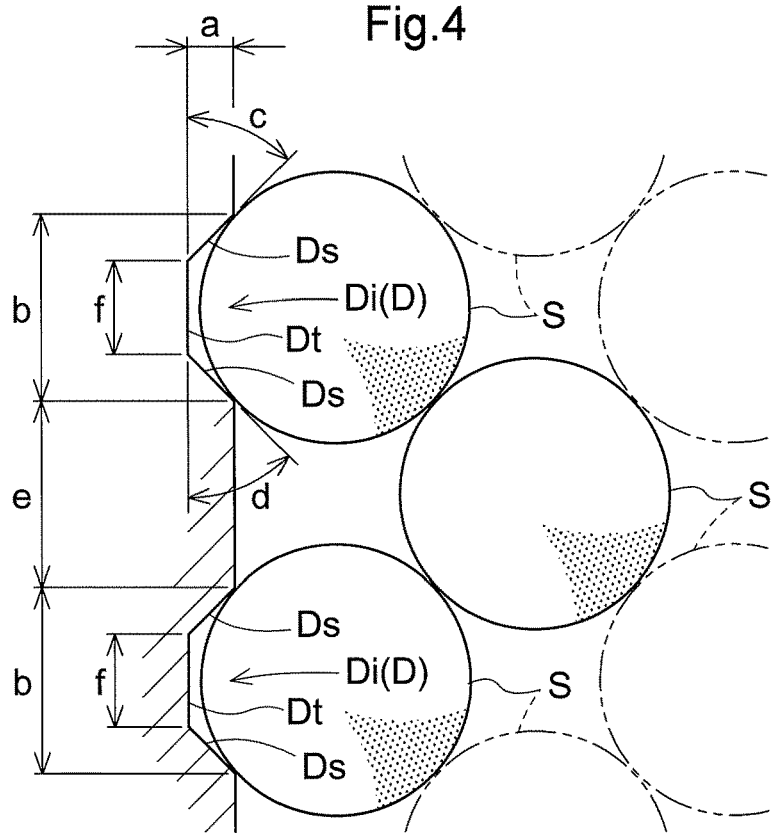
FIG. 4 is a cross-sectional view of engaging recesses.

A catalyst support face U of the inner tube 4, namely an outer face 4g of the inner tube 4 has, in a vertical direction, a plurality of engaging recesses D each capable of receiving a portion of the catalyst grain S in contact with the catalyst support face U in such a manner that the portion of the catalyst grain S is fitted therein, as shown in FIGS. 3 and 4.

A catalyst support face U of the outer tube 3, namely an inner face 3a of the outer tube 3 has a flat shape.

In the present embodiment, each catalyst grain S has a spherical shape, and the distance between the outer face 4g of the inner tube 4 and the inner face 3a of the outer tube 3 is five times the outer diameter H of the catalyst grain S.

Each catalyst grain S has a spherical shape in the following description of the present embodiment, but the catalyst grain S may alternatively have any other shape, such as a pellet shape.

Each engaging recess D in the present embodiment has an annular recessed groove shape, and a plurality of engaging recesses D are arranged from an upper end to a lower end of the outer face 4g of the inner tube 4.

Each engaging recess D has, in its upper and lower areas, inclined faces Ds that are inclined from an entrance section Di toward a flat distal section Dt in the depth direction, as shown in FIG. 4.

That is, the engaging recess D has an upper inclined face Ds that is gradually inclined downward from an upper end of the entrance section Di toward the distal section Dt in the depth direction, and a lower inclined face Ds that is gradually inclined upward from a lower end of the entrance section Di toward the distal section Dt in the depth direction. In other words, the engaging recess D has a trapezoidal shape.

The depth a of the engaging recess D in the present embodiment corresponds to 20% of the outer diameter H of the catalyst grain S. The opening width b of the entrance section Di corresponds to 80% of the outer diameter H of a catalyst grain S. The inclination angle c of the upper inclined face Ds, of the upper and lower inclined faces Ds, is 45 degrees. The inclination angle d of the lower inclined face Ds, of the upper and lower inclined faces Ds, is 45 degrees. The width f of the distal section Dt corresponds to 40% of the outer diameter H of the catalyst grain S.

The distance e between vertically adjacent entrance sections Di corresponds to 80% of the outer diameter H of the catalyst grain S.

The depth a of the engaging recess D, the opening width b of the entrance section Di, the inclination angle c of the upper inclined face Ds, the inclination angle d of the lower inclined face Ds, and the distance e between vertically adjacent entrance sections Di can be varied as indicated, as an example, by the following equations.

$$a = H/2 \times (100\% \text{ to } 15\%)$$

$$b = H \times (100\% \text{ to } 60\%)$$

$$c = 60 \text{ degrees to } 45 \text{ degrees}$$

$$d = 60 \text{ degrees to } 45 \text{ degrees}$$

$$e = H \times (100\% \text{ to } 30\%)$$

Accordingly, after the burners 1 are switched from a heating stop state to a heating operation state, the outer tube 3 expands in the radial direction more than the inner tube 4, and the gap between the catalyst support face U (outer face 4g) of the inner tube 4 and the catalyst support face U (inner face 3a) of the outer tube 3 increases, thus causing the catalyst grains S packed between the inner tube 4 and the outer tube 3 to attempt to move downward while spreading in the radial direction of the outer tube 3. However, some of the packed catalyst grains S continue to receive with the engaging recesses D. Therefore, even if the catalyst grains S move downward, the amount of downward movement of the catalyst grains S is kept small.

Then, after the burners 1 are switched from the heating operation state to the heating stop state, the outer tube 3 contracts in the radial direction more than the inner tube 4, and the gap between the catalyst support face U (outer face 4g) of the inner tube 4 and the catalyst support face U (inner face 3a) of the outer tube 3 decreases, thus pushing up the catalyst grains S packed between the inner tube 4 and the outer tube 3. However, the amount of downward movement of the catalyst grains S in the heating operation state of the burners 1 is kept small. Therefore, even if the catalyst grains S are pushed up, the amount by which the catalyst grains S are pushed up is small, and the catalyst grains S can avoid being subjected to a significant compression effect. As a result, deformation and damage of the catalyst grains S can be suppressed.

Further, the outer tube 3 extends in the axial direction more than the inner tube 4 in response to switching the burners 1 from the heating stop state to the heating operation state, and the catalyst support face U (inner face 3a) of the outer tube 3, which contracts in the axial direction more than the inner tube 4 in response to switching the burners 1 from the heating operation state to the heating stop state, has a flat shape. Therefore, the catalyst support face U (inner face 3a) of the outer tube 3 can smoothly slide relative to the catalyst grains S packed between the inner tube 4 and the outer tube 3, thus suppressing damage of the catalyst grains S.

In addition, each engaging recess D has, in its upper and lower areas, the inclined faces Ds the gap between which gradually narrows from the entrance section Di toward the distal section Dt, and is therefore capable of receiving a portion of a catalyst grain S that is to be inserted into the engaging recess D, with use of the inclined faces Ds. This configuration suppresses damage of the surface part of the catalyst grain S when the engaging recess D engages with and supports the catalyst grain S.

Another Configuration of Reactor

Next, another configuration of the reactor will be described. The same constituent parts as those of the above-described reactor will be described with the same reference numerals.

Figure 5:
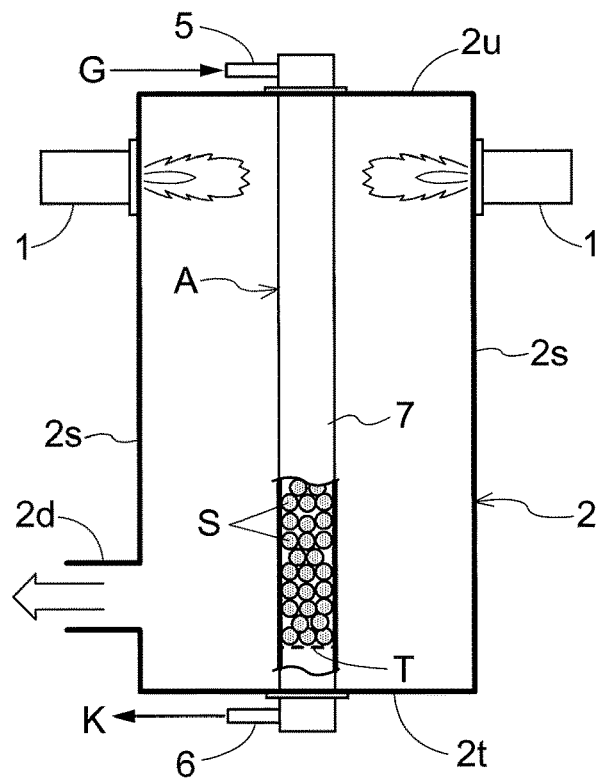
FIG. 5 is a schematic vertical cross-sectional view of a reforming apparatus with a different configuration as viewed from the front.

The reaction tube A has a single cylindrical tubular body 7 with the catalyst grains S packed therein, and the tubular body 7 has, in its bottom section, a porous body T (an example of a catalyst supporter) that receives the catalyst grains S and allows the reformed gas K (an example of a processed gas) to flow therethrough, as shown in FIG. 5.

The tubular body 7 penetrates the upper wall 2*u* and a bottom wall 2*t* of the reforming furnace 2. The feedstock gas tube 5 for introducing a feedstock gas G, in which steam is mixed, is connected to a portion of the tubular body 7 that protrudes from the upper wall 2*u* of the reforming furnace 2. The reformed gas guide tube 6 for guiding the reformed gas K is connected to a portion of the tubular body that protrudes from the bottom wall 2*t* of the reforming furnace 2.

The tubular body 7 of the reaction tube A is heated to a high temperature (e.g., the average temperature is about 800° C.) by being heated to a target temperature for reforming reaction by the burners 1 installed on the side walls 2*s* of the reforming furnace 2. The catalyst grains S are heated to a temperature lower than that of the tubular body 7 (e.g., the average temperature is about 650° C.) with the temperature rise of the tubular body 7.

Then, the feedstock gas G introduced from the feedstock gas tube 5 flows downward through the section packed with the catalyst grains S within the tubular body 7, thereby being reformed to a reformed gas K with high hydrogen content through a steam reforming process. The reformed gas K is discharged through the reformed gas guide tube 6.

Note that, although a detailed description is omitted, the reformed gas K discharged through the reformed gas guide tube 6 is conveyed to a CO transformer and subjected to a transforming process to transform carbon monoxide contained in the reformed gas K into carbon dioxide with use of the CO transformer. Thereafter, for example, the reformed gas K is fed to a pressure swing absorber (PSA) to produce a product gas with high hydrogen content.

A catalyst support face U of the tubular body 7, i.e., an inner face 7*n* of the tubular body 7 has engaging recesses D, as shown in FIG. 6.

Although not shown in the diagrams, a plurality of engaging recesses D, each of which has an annular recessed groove shape, are arranged from an upper end to a lower end of the inner face 7*n* of the tubular body 7 in the present embodiment.

The specific configuration of the engaging recesses D of the present embodiment is the same as the engaging recesses D of the above-described reactor, and a detailed description thereof is omitted.

Accordingly, after the burners 1 are switched from the heating stop state to the heating operation state, the tubular body 7 expands in the radial direction, and the catalyst grains S packed in the tubular body 7 attempt to move downward while spreading in the radial direction of the tubular body 7. However, some of the packed catalyst grains S continue to receive with the engaging recesses D. Therefore, even if the catalyst grains S move downward, the amount of downward movement of the catalyst grains S is kept small.

Thereafter, after the burners 1 are switched from the heating operation state to the heating stop state, the tubular body 7 contracts in the radial direction, thus pushing up the catalyst grains S packed in the tubular body 7. However, the amount of downward movement of the catalyst grains S is kept small while the burners 1 are in the heating operation state. Therefore, even if the catalyst grains S are pushed up, the amount by which the catalyst grains S are pushed up is small, and the catalyst grains S can avoid being subjected to a significant compression effect. As a result, deformation and damage of the catalyst grains S can be suppressed.

Variations

Next, variations will be listed.

(1) The above embodiment has described, as an example, a reaction tube A that is included in a reforming apparatus that performs a steam reforming process on the feedstock gas G. However, the present invention is applicable to various reaction tubes A that are included in reactors for use in various applications.

(2) The above embodiment has described, as an example, the case where the reaction tube A is constituted by the outer tube 3 and the inner tube 4, the upper end section of the outer tube 3 is supported by the upper wall 2*u* of the reforming furnace 2, and the upper end section of the inner tube 4 is supported by the tube upper wall 3*u* of the outer tube 3. However, the specific configuration for supporting the upper end section of the outer tube 3 and the upper end section of the inner tube 4 can be changed in various manner; for example, the upper end section of the inner tube 4 and the upper end section of the outer tube 3 may be separately supported by the reforming furnace 2.

(3) The above embodiment has described, as an example of a catalyst supporter, a porous body T that receives and supports the catalyst grains S. However, the specific configuration of the catalyst supporter can be changed in various manners; for example, the catalyst supporter may have a plate shape in which a flow hole for causing the reformed gas K to flow therethrough are in a row along the circumferential direction.

(4) The above embodiment has described, as an example, the case where each of the engaging recesses D has an annular recessed groove shape. However, the specific configuration of the engaging recesses D can be changed in various manners; for example, each of the engaging recesses D may be a hole-shaped recessed portion, and the engaging recesses D are in a staggered arrangement in the catalyst support face U.

(5) The above embodiment has described, as an example, the case where the engaging recesses D are formed over the entire catalyst support face U from the upper end to the lower end thereof. However, the engaging recesses D may alternatively be in a part of the catalyst support face U; for example, the engaging recesses D may be in the upper half or the lower half of the catalyst support face U.

(6) The above embodiment has described, as an example, the case where the reaction tube A is constituted by the outer tube 3 and the inner tube 4, the outer face 4*g* of the inner tube 4 that serves as a catalyst support face U have a plurality of engaging recesses D in the up-down direction, and the inner face 3*a* of the outer tube 3 that serves as a catalyst support face U has a flat shape. However, if, for example, the entire length of the reaction tube A is short, the outer face 4g of the inner tube 4 that serves as a catalyst support face U and the inner face 3a of the outer tube 3 that serves as a catalyst support face U may each have the engaging recesses D.

Note that configurations disclosed in the above embodiments (including variations; the same applies to the following) can be combined with configurations disclosed in any other embodiments as long as no contradiction arises. The embodiments disclosed in the present specification are examples, and embodiments of the present invention are not limited thereto. The present invention can be modified as appropriate without departing from the objects of the present invention.

DESCRIPTION OF REFERENCE SIGNS

1: Burning unit
3: Outer tube
3a: Inner face
4: Inner tube
4g: Outer face
7: Tubular body
A: Reaction tube
D: Engaging recess
Di: Entrance section
Ds: Inclined face
Dt: Distal section
S: Catalyst
U: Catalyst support face

The invention claimed is:

1. A reactor comprising:
a reaction tube aligned in an up-down direction and comprising, in a bottom section thereof, a catalyst supporter receiving packed catalyst grains and allowing a processed gas to flow therethrough; and
a burning unit configured to heat an outer face of the reaction tube,
wherein the reaction tube has a cylindrical catalyst support face that is in contact with the catalyst grains in the reaction tube and that have, in the up-down direction, a plurality of engaging recesses each capable of receiving a portion of the catalyst grain in contact with the catalyst support face in such a manner that the portion of the catalyst grain is fitted into the engaging recess,
wherein the reaction tube comprises an outer tube having a closed bottom section and a supported upper end section, and an inner tube having an open bottom section and located inside the outer tube such that an upper end section of the inner tube is supported,
wherein the catalyst grains are packed between the outer tube and the inner tube,
wherein the catalyst supporter is located in a bottom section of the inner tube,
wherein the burning unit is configured to heat an outer face of the outer tube,
wherein the inner tube has an outer face serving as the catalyst support face and having the engaging recesses, and
wherein the outer tube has an inner face serving as the catalyst support face and having a flat shape.

2. The reactor according to claim 1, wherein each of the engaging recesses has an annular recessed groove shape.

3. The reactor according to claim 1, wherein each of the engaging recesses has an upper inclined face that is gradually inclined downward from an upper end of an entrance section toward a distal section in a depth direction, and a lower inclined face that is gradually inclined upward from a lower end of the entrance section toward the distal section.

* * * * *